US011432275B2

(12) United States Patent
Nazar et al.

(10) Patent No.: US 11,432,275 B2
(45) Date of Patent: *Aug. 30, 2022

(54) METHOD AND APPARATUS FOR ALLOCATING RESOURCES FOR AN ENHANCED PHYSICAL HYBRID AUTOMATIC REPEAT REQUEST INDICATOR CHANNEL

(71) Applicant: InterDigital Patent Holdings, Inc., Wilmington, DE (US)

(72) Inventors: Shahrokh Nayeb Nazar, San Diego, CA (US); Moon-il Lee, Melville, NY (US); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,711

(22) Filed: Feb. 28, 2020

(65) Prior Publication Data

US 2020/0205136 A1 Jun. 25, 2020

Related U.S. Application Data

(63) Continuation of application No. 15/225,246, filed on Aug. 1, 2016, now Pat. No. 10,743,297, which is a
(Continued)

(51) Int. Cl.
*H04W 72/04* (2009.01)
*H04L 1/16* (2006.01)
(Continued)

(52) U.S. Cl.
CPC ......... *H04W 72/042* (2013.01); *H04L 1/1671* (2013.01); *H04L 1/1812* (2013.01);
(Continued)

(58) Field of Classification Search
CPC ............ H04W 72/042; H04W 72/0446; H04L 1/1671; H04L 1/1812; H04L 1/1858; H04L 1/1861
See application file for complete search history.

(56) References Cited

U.S. PATENT DOCUMENTS 8,867,430 B2 10/2014 Chung et al.
8,909,060 B2 12/2014 Fukuchi
(Continued)

FOREIGN PATENT DOCUMENTS

CN 101610586 12/2009
CN 101868033 10/2010
(Continued)

OTHER PUBLICATIONS

Alcatel-Lucent Shanghai Bell et al., "PHICH Enhancements," 3GPP TSG RAN WG1 Meeting #68bis, R1-122503, Prague, Czech Republic (May 21-25, 2012).
(Continued)

*Primary Examiner* — Jael M Ulysse
(74) *Attorney, Agent, or Firm* — Volpe Koenig

(57) ABSTRACT

Methods and apparatus are described. A wireless transmit/receive unit (WTRU) includes a transceiver and a processor. The transceiver and the processor receive a master information block (MIB) on a physical broadcast channel (PBCH), wherein the MIB includes an indication of control channel element (CCE) resources, transmit uplink data on a physical uplink shared channel (PUSCH, and receive at least one CCE in the indicated CCE resources. The at least one CCE includes multiple bits, each of which indicates whether a respective block of data is required to be retransmitted. At least the multiple bits are channel coded and have a cyclic redundancy check (CRC) attached.

15 Claims, 10 Drawing Sheets

Related U.S. Application Data continuation of application No. 13/630,357, filed on Sep. 28, 2012, now Pat. No. 9,408,202.

(60) Provisional application No. 61/682,024, filed on Aug. 10, 2012, provisional application No. 61/541,732, filed on Sep. 30, 2011.

(51) Int. Cl.
  *H04L 1/18* (2006.01)
  *H04L 5/00* (2006.01)

(52) U.S. Cl.
  CPC .......... *H04L 1/1858* (2013.01); *H04L 1/1861* (2013.01); *H04L 5/0055* (2013.01); *H04W 72/0446* (2013.01)

(56) References Cited

U.S. PATENT DOCUMENTS

| | | | |
|---|---|---|---|
| 8,923,201 | B2 | 12/2014 | Papasakellariou et al. |
| 2003/0076783 | A1 | 4/2003 | Das et al. |
| 2007/0049320 | A1 | 3/2007 | Usuda et al. |
| 2009/0022110 | A1 | 1/2009 | Muharemovic et al. |
| 2009/0055703 | A1 | 2/2009 | Kim et al. |
| 2009/0088148 | A1* | 4/2009 | Chung ............... H04L 5/0053 455/423 |
| 2009/0103562 | A1* | 4/2009 | Frederiksen ........ H04W 28/18 370/468 |
| 2009/0143072 | A1 | 6/2009 | Montojo et al. |
| 2009/0161618 | A1 | 6/2009 | Johansson et al. |
| 2009/0197630 | A1 | 8/2009 | Ahn et al. |
| 2009/0201904 | A1 | 8/2009 | Lee et al. |
| 2009/0207793 | A1* | 8/2009 | Shen .................. H04L 1/1861 370/329 |
| 2009/0257449 | A1 | 10/2009 | Chen et al. |
| 2009/0259909 | A1 | 10/2009 | Luo |
| 2009/0268693 | A1 | 10/2009 | Lindh et al. |
| 2009/0285160 | A1 | 11/2009 | Cheng et al. |
| 2010/0074202 | A1 | 3/2010 | Park et al. |
| 2010/0115367 | A1 | 5/2010 | Hsu |
| 2010/0157927 | A1 | 6/2010 | Mochizuki et al. |
| 2010/0165847 | A1 | 7/2010 | Kamuf et al. |
| 2010/0208629 | A1* | 8/2010 | Ahn ................... H04L 5/0053 370/280 |
| 2010/0246455 | A1 | 9/2010 | Nangia et al. |
| 2010/0254327 | A1 | 10/2010 | McBeath et al. |
| 2010/0291937 | A1 | 11/2010 | Hu et al. |
| 2010/0296459 | A1* | 11/2010 | Miki .................. H04L 1/0028 370/329 |
| 2010/0322165 | A1 | 12/2010 | Yoo |
| 2010/0322291 | A1 | 12/2010 | Kaikkonen et al. |
| 2010/0331037 | A1 | 12/2010 | Jen |
| 2011/0007673 | A1* | 1/2011 | Ahn ................... H04L 5/0053 370/280 |
| 2011/0013615 | A1* | 1/2011 | Lee, II .............. H04L 5/0023 370/344 |
| 2011/0044261 | A1* | 2/2011 | Cai ................... H04W 72/042 370/329 |
| 2011/0064164 | A1 | 3/2011 | Seo et al. |
| 2011/0070845 | A1* | 3/2011 | Chen ................. H04L 5/0053 455/352 |
| 2011/0075624 | A1* | 3/2011 | Papasakellariou .... H04W 72/04 370/329 |
| 2011/0081939 | A1* | 4/2011 | Damnjanovic ....... H04W 52/54 455/522 |
| 2011/0083066 | A1* | 4/2011 | Chung ............... H03M 13/09 714/E11.032 |
| 2011/0096745 | A1 | 4/2011 | Ahn et al. |
| 2011/0110444 | A1* | 5/2011 | Roh ................... H04L 5/0044 375/260 |
| 2011/0116465 | A1* | 5/2011 | Miki ................. H04W 72/1215 370/329 |
| 2011/0122846 | A1* | 5/2011 | Yu ...................... H04L 1/0079 370/335 |
| 2011/0170496 | A1 | 7/2011 | Fong et al. |
| 2011/0194443 | A1 | 8/2011 | Li et al. |
| 2011/0194501 | A1* | 8/2011 | Chung ................ H04L 5/0053 370/328 |
| 2011/0194524 | A1 | 8/2011 | Hedlund et al. |
| 2011/0205995 | A1 | 8/2011 | Grovlen |
| 2011/0211489 | A1* | 9/2011 | Chung ................. H04L 5/003 370/252 |
| 2011/0211522 | A1 | 9/2011 | Chung et al. |
| 2011/0223924 | A1* | 9/2011 | Lohr ................... H04L 1/1607 455/450 |
| 2011/0239072 | A1* | 9/2011 | Cai .................... H04W 72/042 455/450 |
| 2011/0249633 | A1 | 10/2011 | Hong et al. |
| 2011/0261729 | A1 | 10/2011 | Ahn et al. |
| 2011/0268062 | A1 | 11/2011 | Ji et al. |
| 2011/0305214 | A1 | 12/2011 | Seol et al. |
| 2012/0039220 | A1 | 2/2012 | Chen et al. |
| 2012/0044882 | A1* | 2/2012 | Kim .................... H04L 5/0058 370/328 |
| 2012/0083283 | A1 | 4/2012 | Phan et al. |
| 2012/0120868 | A1 | 5/2012 | Park et al. |
| 2012/0120908 | A1 | 5/2012 | Ahn et al. |
| 2012/0147840 | A1 | 6/2012 | Chen |
| 2012/0163305 | A1 | 6/2012 | Nimbalker et al. |
| 2012/0275320 | A1 | 11/2012 | Iyer |
| 2012/0282936 | A1 | 11/2012 | Gao et al. |
| 2012/0320846 | A1 | 12/2012 | Papasakellariou et al. |
| 2012/0320848 | A1 | 12/2012 | Chen et al. |
| 2013/0003663 | A1 | 1/2013 | Blankenship et al. |
| 2013/0003672 | A1* | 1/2013 | Dinan ................ H04W 52/0206 370/329 |
| 2013/0003673 | A1 | 1/2013 | Dinan |
| 2013/0039272 | A1 | 2/2013 | Chen |
| 2013/0039299 | A1* | 2/2013 | Papasakellariou .... H04L 5/0048 370/329 |
| 2013/0044692 | A1 | 2/2013 | Nory et al. |
| 2013/0064216 | A1 | 3/2013 | Gao et al. |
| 2013/0083736 | A1 | 4/2013 | Yin et al. |
| 2013/0201926 | A1 | 8/2013 | Nam et al. |
| 2016/0127106 | A1 | 5/2016 | Nogami et al. |

FOREIGN PATENT DOCUMENTS

| | | |
|---|---|---|
| WO | 2010/053984 | 5/2010 |
| WO | 2010/090950 | 8/2010 |
| WO | 2010/124242 | 10/2010 |
| WO | 2011/002218 | 1/2011 |
| WO | 2011/037439 | 3/2011 |

OTHER PUBLICATIONS

LG Electronics, "Considerations on Other Control Channels," 3GPP TSG RAN WG1 Meeting #69, R1-122315, Prague, Czech Republic (May 21-25, 2012).

Pantech, "Views on enhanced PHICH," 3GPP TSG RAN1 #69, R1-122457, Prague, Czech Republic (May 21-25, 2012).

Research in Motion et al., "Other Control Channels for E-PDCCH," 3GPP TSG RAN WG1 Meeting #69, R1-122724, Prague, Czech Republic (May 21-25, 2012).

Samsung, "Discussion on ePDCCH Design Issues," 3GPP TSG-RAN WG1#66 meeting, Athens, Greece, R1-112517, (Aug. 22-26, 2011).

Samsung, "ePHICH design for Rel-11," 3GPP TSG RAN WG1 Meeting #69, R1-122258, Prague, Czech Republic (May 21-25, 2012).

Samsung, "PDCCH Extension to Support Operation with Cross-Carrier Scheduling," 3GPP TSG RAN WG1 #60, R1-101142, San Francisco, USA (Feb. 22-26, 2010).

Texas Instruments, "PDCCH and PHICH Multiplexing Issues," 3GPP TSG RAN WG1 51, R1-074684, Jeju, Korea (Nov. 5-9, 2007).

Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.3.0, Sep. 2011.

(56) References Cited

OTHER PUBLICATIONS

Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.6.0, Jun. 2012.
Third Generation Partnership Project, "Technical Specification Group Radio Access Network; Evolved Universal Terrestrial Radio Access (E-UTRA); Multiplexing and Channel Coding (Release 11)," 3GPP TS 36.212 v11.0.0, Sep. 2012.
Third Generation Partnership Project, "Technical Specification Group Radio Access Network; Evolved Universal Terrestrial Radio Access (E-UTRA); Physical Channels and Modulation (Release 10)," 3GPP TS 36.211 v10.3.0, Sep. 2011.
Third Generation Partnership Project, "Technical Specification Group Radio Access Network; Evolved Universal Terrestrial Radio Access (E-UTRA); Physical Channels and Modulation (Release 10)," 3GPP TS 36.211 v10.5.0, Jun. 2012.
Third Generation Partnership Project, "Technical Specification Group Radio Access Network; Evolved Universal Terrestrial Radio Access (E-UTRA); Physical Channels and Modulation (Release 11)," 3GPP TS 36.211 v11.0.0, Sep. 2012.
Third Generation Partnership Project, "Technical Specification Group Radio Access Network; Evolved Universal Terrestrial Radio Access (E-UTRA); Physical Layer Procedures (Release 10)," 3GPP TS 36.213 v10.3.0, Sep. 2011.
Third Generation Partnership Project, "Technical Specification Group Radio Access Network; Evolved Universal Terrestrial Radio Access (E-UTRA); Physical Layer Procedures (Release 10)," 3GPP TS 36.213 v10.7.0, Sep. 2012.
Third Generation Partnership Project, "Technical Specification Group Radio Access Network; Evolved Universal Terrestrial Radio Access (E-UTRA); Physical Layer Procedures (Release 11)," 3GPP TS 36.213 v11.0.0, Sep. 2012.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0 (Jun. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.3.0 (Sep. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.2.0 (Jun. 2011).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.6.0 (Sep. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.2.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.6.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 2012).

* cited by examiner

| Sequence index $n_{PHICH}^{SEQ}$ | Orthogonal sequence Normal cyclic prefix $N_{SF}^{PHICH}=4$ | Extended cyclic prefix $N_{SF}^{PHICH}=2$ |
|---|---|---|
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

FIG. 3

| HI | HI code word $\langle b_0, b_1, b_2 \rangle$ | One ACK/NACK information bit |
|---|---|---|
| 0 | $\langle 0,0,0 \rangle$ | NACK |
| 1 | $\langle 1,1,1 \rangle$ | ACK |

FIG. 4

| HI | HI CODE WORD $<b_0,b_1,b_2,b_3>$ | FIRST ACK/NACK INFORMATION BIT | SECOND ACK/NACK INFORMATION BIT |
|---|---|---|---|
| 0 | $<0,0,0,0>$ | NACK | NACK |
| 1 | $<0,1,0,1>$ | NACK | ACK |
| 2 | $<1,0,1,0>$ | ACK | NACK |
| 3 | $<1,1,1,1>$ | ACK | ACK |

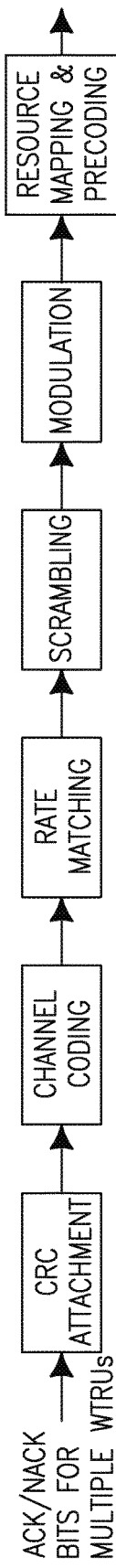
FIG. 7
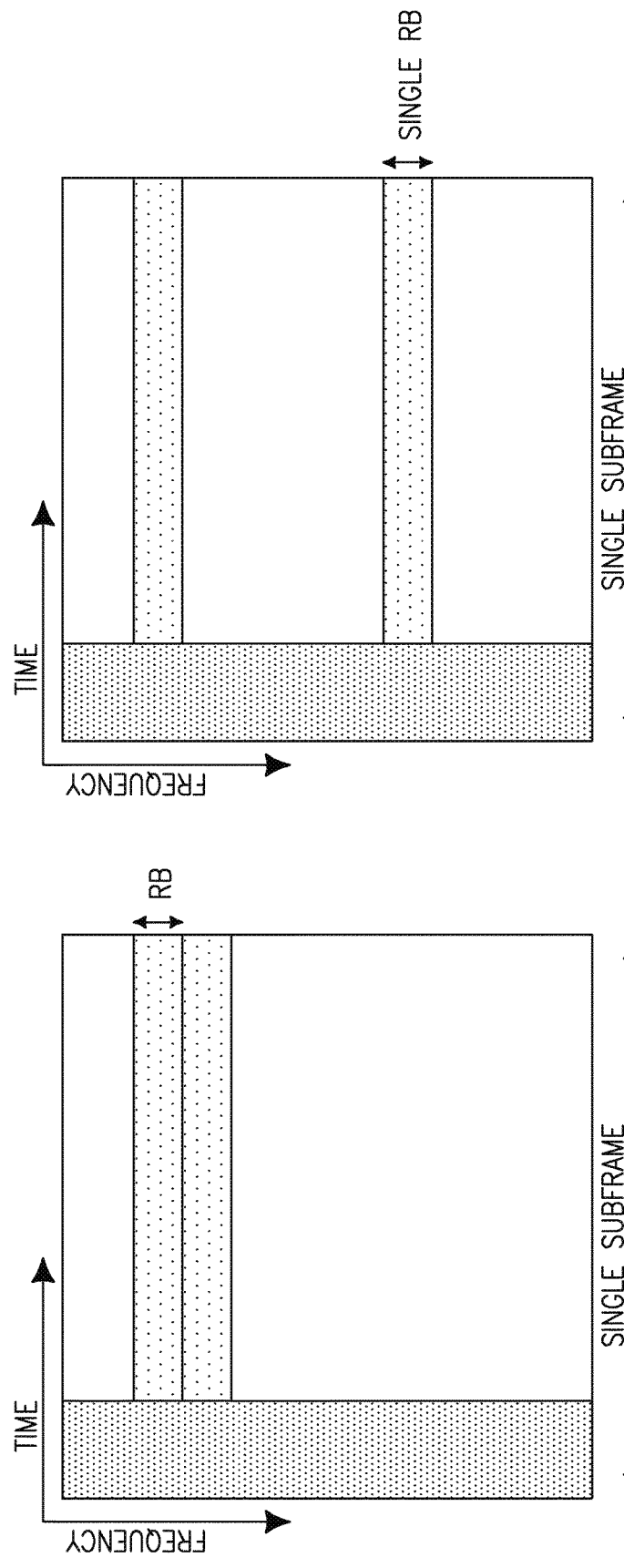
FIG. 8A
FIG. 8B

| | NUMBER OF REGs WITHIN AN RB WHEN THERE IS NO CSI-RS CONFIGURED IN THE SUBFRAME (REG OF LENGTH 4) | |
|---|---|---|
| | DM-RS BASED SUBFRAME | CRS BASED SUBFRAME |
| NO PDCCH | 38 | 36 |
| 1 OFDM SYMBOL | 35 | 34 |
| 2 OFDM SYMBOLS | 32 | 32 |
| 3 OFDM SYMBOLS | 29 | 29 |

METHOD AND APPARATUS FOR ALLOCATING RESOURCES FOR AN ENHANCED PHYSICAL HYBRID AUTOMATIC REPEAT REQUEST INDICATOR CHANNEL

CROSS REFERENCE TO RELATED APPLICATIONS

This application is a continuation of U.S. patent application Ser. No. 15/225,246, filed Aug. 1, 2016, which is a continuation of U.S. patent application Ser. No. 13/630,357, filed Sep. 28, 2012, which issued as U.S. Pat. No. 9,408,202 on Aug. 2, 2016, which claims the benefit of U.S. Provisional Application No. 61/541,732, filed Sep. 30, 2011, and U.S. Provisional Application No. 61/682,024, filed Aug. 10, 2012, which are incorporated by reference as if fully set forth.

BACKGROUND

The uplink of a Long Term Evolution (LTE) system supports two modes of hybrid automatic repeat request (HARQ) operations: adaptive and non-adaptive HARQ. In the case of non-adaptive HARQ, the retransmission request is sent on a physical HARQ indicator channel (PHICH) through the transmission of a negative acknowledgment (NACK) signal. In the case of adaptive HARQ, which is activated by transmitting an acknowledgment (ACK) signal on the PHICH, according to the previous transmissions and depending on the resource scheduling of other users in the system, both the format and the frequency location of retransmissions are signaled by the physical downlink control channel (PDCCH) while overriding the PHICH.

SUMMARY

A method and apparatus are described for allocating resources for an enhanced physical hybrid automatic repeat request (HARQ) channel (E-PHICH). A subset of an enhanced physical downlink control channel (E-PDCCH) may be allocated for use by the E-PHICH. The E-PDCCH may be defined by at least one of enhanced resource element groups (eREGs) and enhanced control channel elements (eCCEs). Each eCCE may be formed by grouping a plurality of eREGs. Each eREG may contain at least one resource element (RE). Alternatively, a subset of eREGs may be allocated as E-PHICH resources. E-PDCCH physical resource block (PRB) pairs may be selected as a resource for the E-PHICH. An indication of the number of the eCCEs may be broadcast to a wireless transmit/receive unit (WTRU).

BRIEF DESCRIPTION OF THE DRAWINGS

A more detailed understanding may be had from the following description, given by way of example in conjunction with the accompanying drawings wherein:

FIG. 3 shows an orthogonal sequence according to a sequence index and a spreading factor;

FIG. 4 shows HARQ indicator (HI) code words with a repetition factor of 3;

FIG. 5 shows HI code words with a repetition factor of 4;

FIGS. 6 and 7 show evolved PHICH (E-PHICH) signal construction;

FIGS. 8A and 8B show localized and distributed resource block allocation for E-PHICH;

DETAILED DESCRIPTION

Figure 1A:
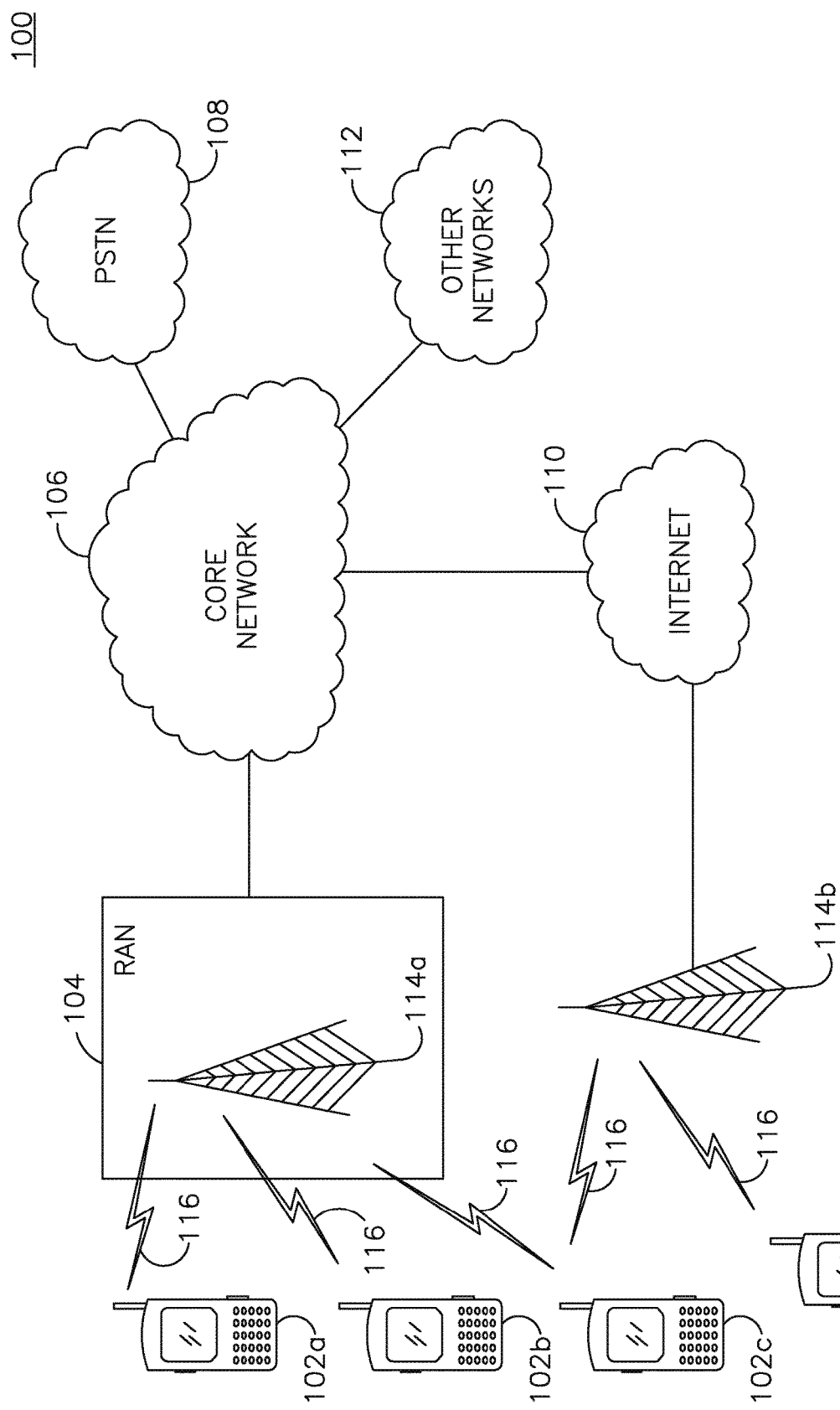
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
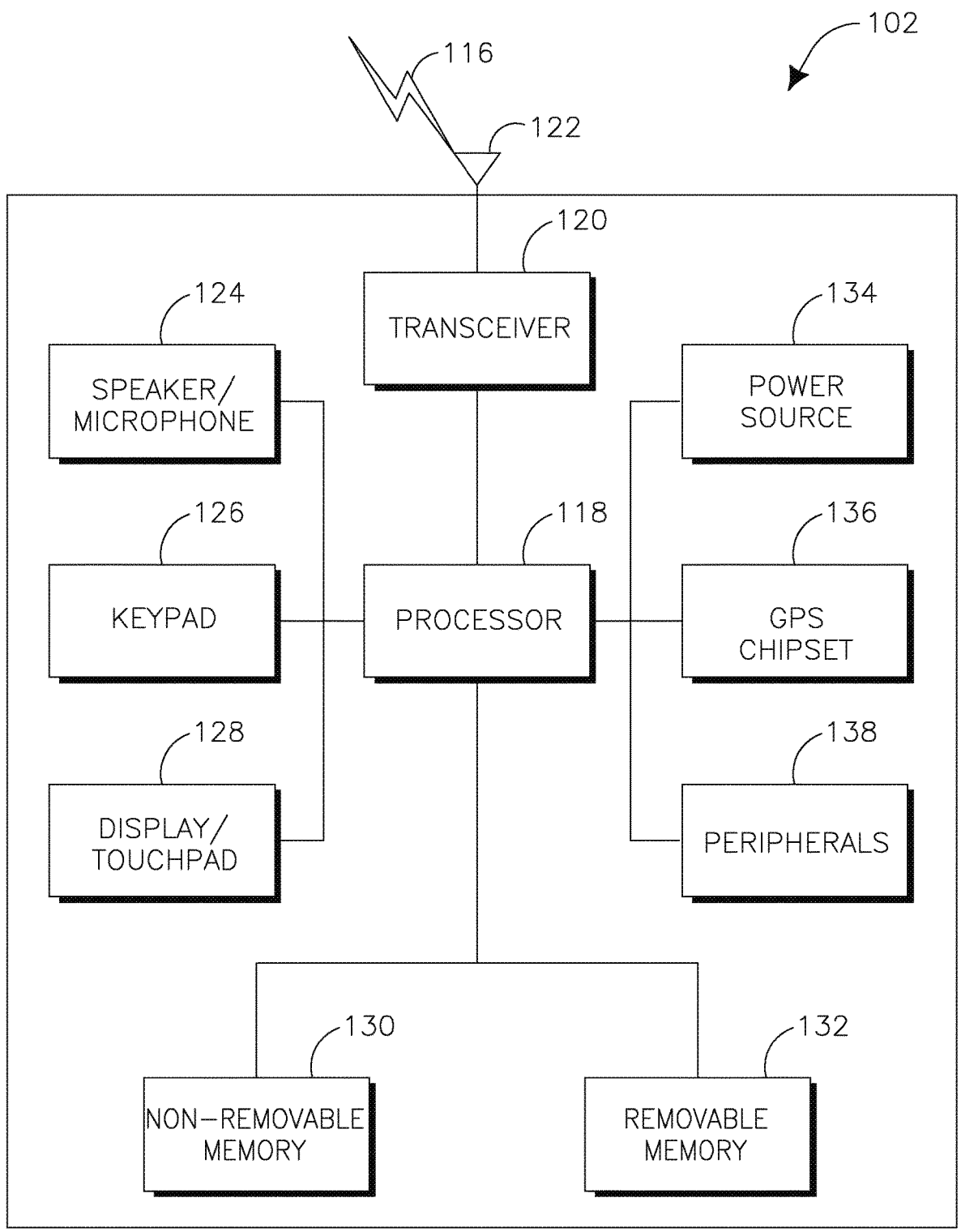
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
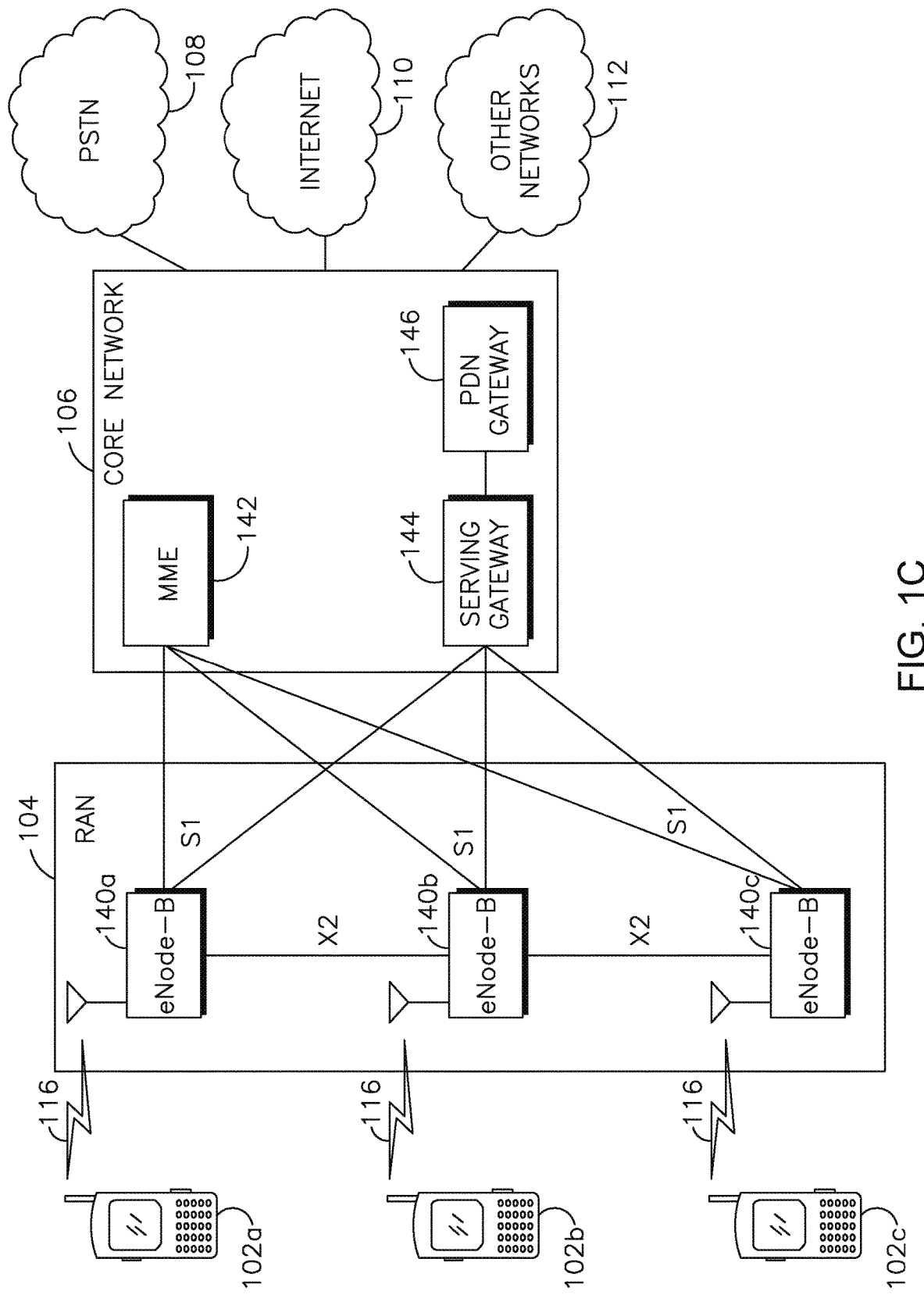
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A PHICH may be used to transmit an ACK signal or a NACK signal corresponding to a physical uplink shared channel (PUSCH) transmitted in an uplink subframe. A PHICH may be transmitted in a distributed manner across the system bandwidth and orthogonal frequency division multiplexing (OFDM) symbols within a downlink control channel. The number of OFDM symbols may be defined as the PHICH duration and may be configurable via higher layer signaling. Unlike a physical control format indicator channel (PCFICH), the PHICH resource position may vary according to the PHICH duration.

Figure 2:
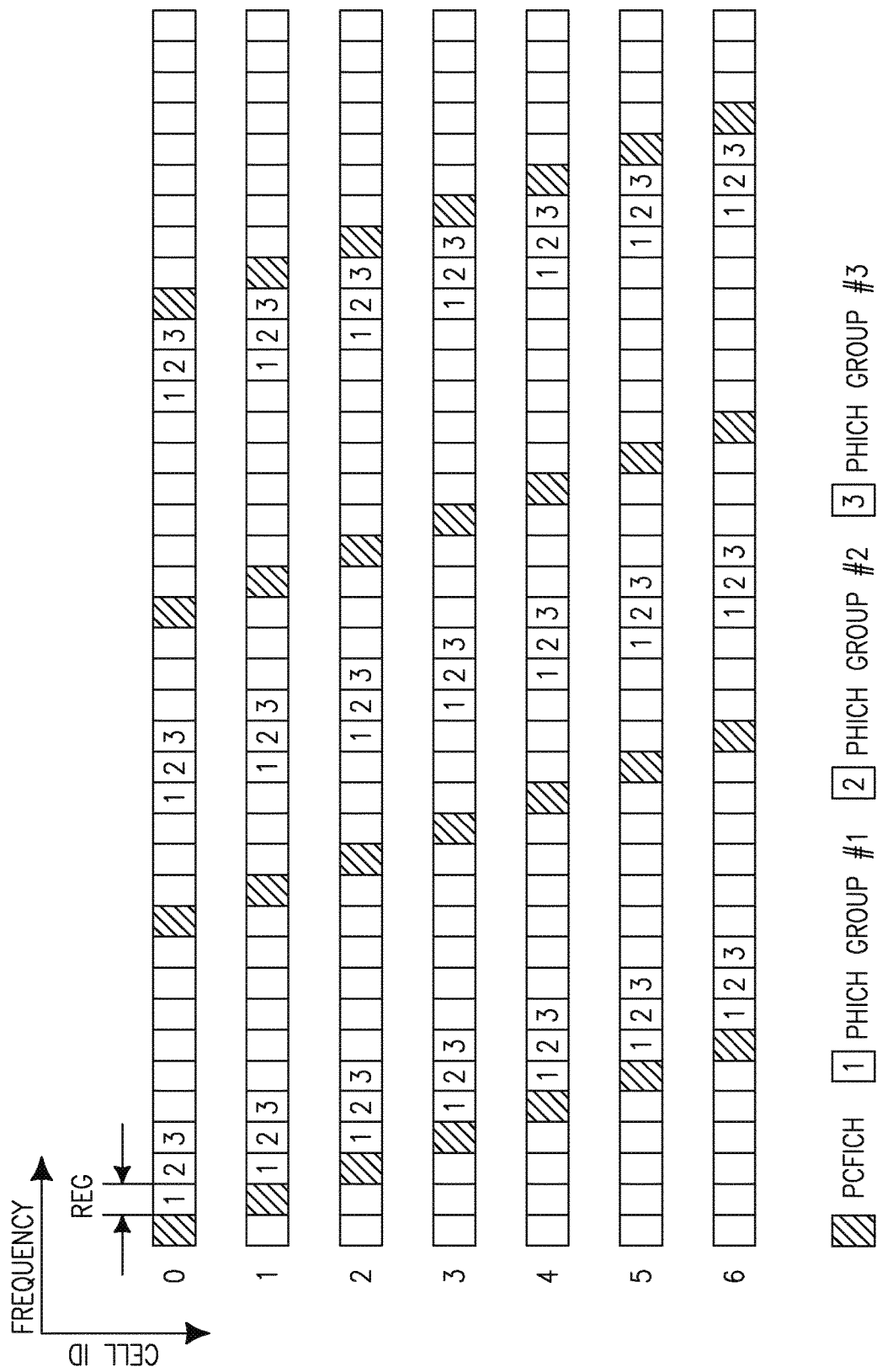
FIG. 2 shows physical control format indicator channel (PCFICH) and physical hybrid automatic repeat request (HARQ) indicator channel (PHICH) resource element group (REG) allocation according to a physical cell identifier (PCI)

FIG. 2 shows PCFICH and PHICH resource element group (REG) allocation according to a physical cell identifier (PCI), (e.g., 40 resource blocks (RBs)).

As shown in FIG. 2, multiple PHICH groups are defined in a cell. A PHICH group may contain multiple PHICHs with orthogonal sequences. The PHICH for a WTRU may be defined dynamically with resource information in an uplink grant, such as by a lowest physical resource block (PRB) index ($I_{PRB_{RA}}^{lowest_{index}}$) and a demodulation reference signal (DM-RS) cyclic shift ($n_{DMRS}$), where $PRB_{RA}$ may denote the PRBs granted for PUSCH transmission. Therefore, a two index pair (PHICH group index: $n_{PHICH}^{group}$, PHICH sequence index: $n_{PHICH}^{seq}$) may indicate the PHICH resource for a specific WTRU. In the PHICH index pair ($n_{PHICH}^{group}$, $n_{PHICH}^{seq}$), each index may be defined as follows:

$$n_{PHICH}^{group} = (I_{PRB_{RA}}^{lowest_{index}} + n_{DMRS}) \bmod N_{PHICH}^{group}; \text{ and} \quad \text{Equation (1)}$$

$$n_{PHICH}^{seq} = \left(\left\lfloor \frac{I_{PRB_{RA}}^{lowest_{index}}}{N_{PHICH}^{group}} \right\rfloor + n_{DMRS}\right) \bmod 2N_{SF}^{PHICH}. \quad \text{Equation (2)}$$

where $N_{PHICH}^{group}$ may denote the number of the PHICH group available in the system with following definition:

$$N_{PHICH}^{group} = \begin{cases} \left\lceil N_g \left(N \frac{RB}{8}^{DL}\right) \right\rceil, \\ 2 \cdot \left\lceil N_g \left(N \frac{RB}{8}^{DL}\right) \right\rceil \end{cases}, \quad \text{Equation (3)}$$

where $N_g$ is 2-bits of information transmitted via the physical broadcasting channel (PBCH), and the information is within $N_g \in \{1/6, 1/2, 1, 2\}$. The orthogonal sequence according to the spreading factor is shown in FIG. 3.

Some potential enhancements of the PDCCH may be introduced in LTE, such as evolved PDCCH (E-PDCCH)). Under these enhancements, the E-PDCCH may start at the first symbol of the subframe, (i.e., symbol #0), which may imply that there is no control region dedicated to the PDCCH and/or PHICH transmission in the subframe. Moreover, there is a general trend in LTE-Advanced (LTE-A) to move from a cell-specific reference signal (CRS) centric design towards a wireless transmit/receive unit (WTRU)-specific reference signal-based transmission. This may imply that the PHICH structure may not be supported in future deployments of LTE-A.

The PHICH may support uplink data retransmissions during a non-adaptive synchronous HARQ operation. To extend the functionality of a synchronous uplink HARQ protocol, a new mechanism may be required as an alternative to PHICH for the HARQ ACK/NACK transmission in the downlink. This mode of HARQ operation may be relevant for semi-persistent scheduling (SPS) where the WTRU relies on the PHICH to receive the ACKs in the absence of an uplink grant.

A new physical channel, the enhanced PHICH (E-PHICH), may be configured to transmit an HARQ ACK/NACK in response to an uplink shared channel (UL-SCH) transmission. A WTRU may receive ACKs on an E-PHICH channel, which is transmitted on a legacy LTE physical downlink shared channel (PDSCH) region.

Repetition coding is used to realize link adaptation for the E-PHICH. The repetition factor may be a predefined number. In this case, the repetition factor may be different according to the system parameters including cyclic prefix (CP) length, in which an extended CP may have a larger repetition factor, since a larger cell range needs to be covered, or duplex mode, whereby time division duplex (TDD) may have a larger repetition factor than frequency division duplex (FDD).

The repetition factor may be cell-specific and configured by a broadcasting channel, (e.g., master information block (MIB), system information block (SIB)). The repetition factor may depend on the channel condition of the WTRU to which the E-PHICH is intended. To obtain a robust E-PHICH design for the WTRUs at the cell edge, the repetition factor may be increased.

An E-PHICH may be used to transmit multiple ACK/NACK information bits according to the repetition factor. For example, if repetition factor 3 is used, one ACK/NACK information bit may be transmitted per E-PHICH. FIG. 4 shows an example of the HARQ indicator (HI) codeword in case of repetition factor 3, which is the same as the legacy PHICH, where HI=1 is for a positive ACK and HI=0 is for a NACK. As another example, if repetition factor 4 is used, two ACK/NACK information bits may be transmitted per E-PHICH as shown in FIG. 5.

Although two ACK/NACK information bits may be transmitted per E-PHICH, one E-PHICH may be assigned for a single WTRU. Therefore, if a WTRU expects only one ACK/NACK information bit, a subset of HIs may used for the WTRU. For example, {HI=0 and HI=3} may be used so that the WTRU assumes that the HI code word is either HI=0 or HI=3.

Figures 5, 6:
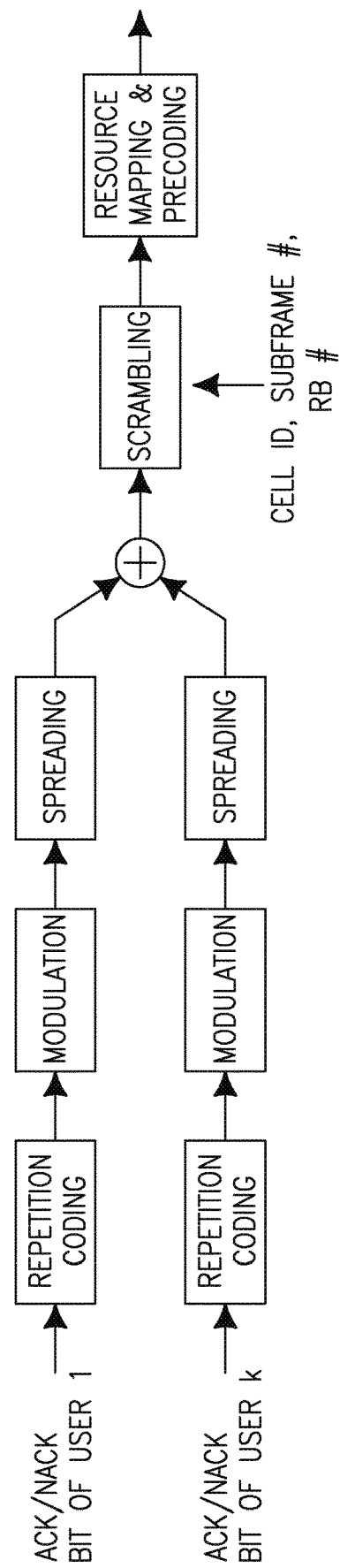

One example of the overall E-PHICH signal construction scheme is shown in FIG. 6. As shown in FIG. 6, at the first stage, a positive ACK may encoded as a binary '1' and a NACK as a binary '0'. Next, the HARQ ACK/NACK bit may be repeated followed by binary phase shift keying (BPSK) or quadrature phase shift keying (QPSK) modulation, resulting in a single HARQ ACK/NACK modulation symbol. The modulation symbols from multiple WTRUs may be code multiplexed using orthogonal codes such as Walsh codes or discrete Fourier transform (DFT) codes, (e.g., a Walsh code of length 4), to form an E-PHICH group. The combined signal may be scrambled with a unique cell-specific (i.e., cell ID), subframe-specific, and/or resource block (RB)-specific scrambling sequence to randomize the inter-cell interference, followed by resource mapping and precoding operations.

An alternative E-PHICH signal construction scheme is shown in FIG. 7. A cyclic redundancy check (CRC) may be attached to the entire payload of ACK/NACK information bits for multiple users. Then, the bits may be channel encoded with a tail-biting convolutional code or turbo code and rate matched to fit the amount of resources assigned for E-PHICH transmission. The sequence of bits may be scrambled by a cell-specific, subframe-specific, and/or RB-specific scrambling sequence to randomize inter-cell interference, followed by modulation, precoding, and mapping to REs.

The E-PHICH region may contain a number of localized or distributed RBs. Using distributed RBs may exploit frequency diversity for better coverage. Two non-limiting examples of resource block mapping for E-PHICH are shown in FIGS. 8A and 8B.

For resource allocation, the WTRU may determine the E-PHICH region according to localized allocation or distributed allocation. For localized allocation, the starting RB location and the number of RBs allocated to the E-PHICH transmission in the case of localized E-PHICH resource allocation may be indicated, as shown in FIG. 8A. For distributed allocation, a bitmap may be signaled which indicates the RBs or resource block groups (RBGs) allocated for E-PHICH transmission, as shown in FIG. 8B.

Figure 9:
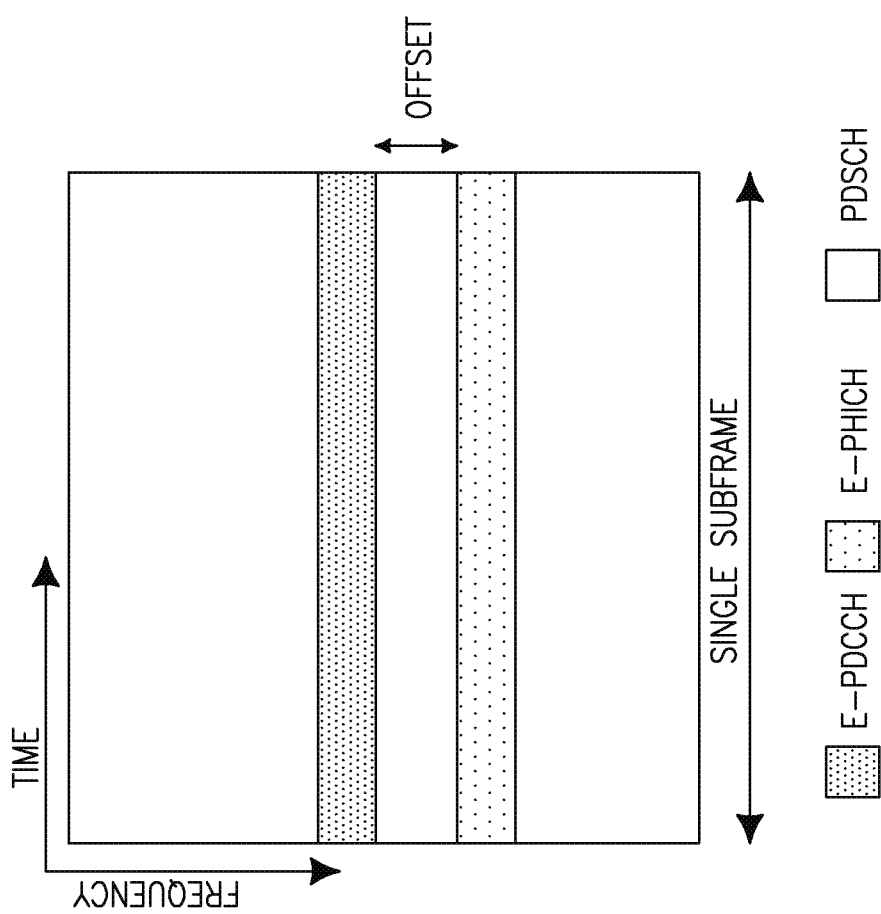
FIG. 9 shows implicit resource block allocation for E-PHICH using an offset with respect to the E-PDCCH.

Implicitly, through the E-PDCCH configuration, the RBs that carry the E-PHICH may be determined using a predefined offset with respect to the E-PDCCH region as shown in FIG. 9. In this example, there may not be a legacy PDCCH region available in the subframe. The E-PDCCH region may be the E-PDCCH common search space, which may be configured in a cell-specific manner via broadcasting channels, (e.g., MIB, SIB-x), or a fixed location according to cell identity (cell-ID) and/or subframe number.

When shared with E-PDCCH, both the E-PHICH and the E-PDCCH may be multiplexed and transmitted on the same control region which includes multiple RBs. E-PHICH resources may be multiplexed on all physical resource blocks (PRBs) configured for E-PDCCH resources. E-PHICH resources may be multiplexed on the PRBs configured for either the E-PDCCH common search space or the E-PDCCH WTRU-specific search space. E-PHICH resources may be multiplexed on a subset of PRBs configured for E-PDCCH resources. The subset may be predefined as the first PRB and may be indicated to a WTRU via broadcasting channels, (e.g., MIB, SIB-x), together with a number of E-PHICH groups.

Alternatively, a set of $N_{VRB}^{E-PHICH}$ virtual resource blocks (VRBs) may be configured for potential E-PHICH transmission by higher layers using resource allocation types 0, 1 or 2. For resource allocation type 2, the VRB to PRB mapping may be configured by higher layers. Configured VRBs may be continuously numbered $n_{VRB}^{E-PHICH}=0, 1, \ldots, N_{VRB}^{E-PHICH}-1$, such that the VRB numbered with $n_{VRB}^{E-PHICH}=0$ refers to the configured VRB with the smallest VRB number $n_{VRB}$, and such that the VRB numbered with $n_{VRB}^{E-PHICH}=N_{VRB}^{E-PHICH}-1$ refers to the configured VRB with the largest $n_{VRB}$.

Resource blocks for the E-PHICH may be indicated in an implicit manner within the resource blocks configured for the E-PDCCH resources. For example, $N_{ePDCCH}$ PRB pairs may be allocated for the E-PDCCH in a subframe and a subset of E-PDCCH PRB pairs $N_{ePHICH}$ may be used for the E-PHICH. The subset of E-PDCCH PRB pairs for the E-PHICH resource allocation may be selected.

A predefined PRB pair among the E-PDCCH resources may be used. For example, the PRB pairs having the lowest and highest index become the E-PHICH resources. Higher layer signaling may be used to indicate which E-PDCCH resources may be used for the E-PHICH transmission. An E-PHICH specific scrambling sequence may be used for the E-PHICH resource detection.

A WTRU configured to monitor the E-PDCCH may receive the configuration information for the E-PDCCH reception and determine which PRB pairs are configured for E-PDCCH reception. Among the PRB pairs for the E-PDCCH, the WTRU may determine the scrambling sequences of the E-PDCCH PRB pairs and, on a condition that the WTRU detects PRB pairs scrambled with E-PHICH specific scrambling sequences, the WTRU may assume that the PRB pairs are not used for E-PDCCH transmission and be considered as E-PHICH resources. The PRB pairs configured for the E-PHICH may be used for the E-PHICH transmission, and not multiplexed with the E-PDCCH. The PRB pairs configured for the E-PHICH may be used for both the E-PHICH and the E-PDCCH transmission. A partial resource within a PBR pair may be used as an E-PHICH resource.

A subset of the E-PDCCH resources may be used for the E-PHICH. The E-PDCCH resource may be defined with an enhanced resource element group (eREG) and/or an enhanced control channel element (eCCE), where an eCCE may be formed by grouping multiple eREGs. The eREG may contain one or more resource elements (REs). Assuming that $N_{ePDCCH}$ PRB pairs are allocated in a subframe, the E-PDCCH resources (i.e., $N_{ePDCCH}$ PRB pairs) may be split into $N_{eCCE}$ eCCEs. Among the $N_{eCCE}$ eCCEs, a subset of the eCCEs may be defined as E-PHICH resources. The E-PDCCH resources may form an E-PDCCH common search space.

The number of eCCEs used for the E-PHICH may be indicated to a WTRU via broadcasting, (e.g., MIB, SIB-x), dedicated signaling, or dynamic indication in each subframe. The eCCEs for the E-PHICH may be configured with a predefined eCCE number. A WTRU configured to monitor the E-PDCCH may consider the eCCE used for the E-PHICH as non-E-PDCCH resources, so that the WTRU may assume that these resources are rate-matched for E-PDCCH reception. The eCCEs for the E-PHICH may be configured via higher layer signaling. The eCCEs for the E-PHICH may be indicated in each subframe by explicit signaling.

Alternatively, a subset of E-PDCCH eREGs may be defined as E-PHICH resources. The E-PDCCH eREGs may be configured within a E-PDCCH common search space. For example, if $N_{eREG}$ is defined within E-PDCCH resources based on $N_{ePDCCH}$ PRB pairs, a subset of eREGs may be defined as E-PHICH resources and the remaining eREGs are used for the E-PDCCH. The number of eREGs used for the E-PHICH may be indicated to a WTRU via broadcasting, dedicated signaling, or dynamic indication. Alternatively, predefined eREG numbers are used for the E-PHICH and the eREG numbers may be defined according to the number of PRB pairs configured for the E-PDCCH.

Alternatively, multiple E-PDCCH resource sets may be defined and one or more PRB pairs may be used per E-PDCCH resource set. The E-PHICH resource may be located in one of the E-PDCCH resource sets. The multiple E-PDCCH resource sets may be defined such that all WTRU-specific search spaces may be partially or fully located in a primary E-PDCCH resource set, and a secondary E-PDCCH resource set may or may not be configured for a WTRU. In this case, the E-PHICH resource may be defined within the primary E-PDCCH resource set. The E-PDCCH resource set may be configured as either a localized E-PDCCH or a distributed E-PDCCH, and the E-PHICH resource may be defined within E-PDCCH resource set configured for distributed E-PDCCH.

The WTRU may receive an E-PHICH configuration as part of the system information transmitted on the physical broadcast channel (PBCH) and/or semi-statically through higher layers, (e.g., system information blocks (SIBs)). The E-PHICH configuration may indicate the number of E-PHICH resources or E-PHICH groups configured in the cell, the modulation and coding scheme, the precoder index used for precoding of WTRU-specific reference symbols and E-PHICH information, the antenna ports assigned for E-PHICH transmission, (i.e., demodulation reference signal (DM-RS) antenna port), the number of antenna ports transmitting the cell-specific reference symbols, the boosting value for the reference symbols, (e.g., cell-specific reference symbols), or the repetition factor, (i.e., number of resource element groups used for E-PHICH transmission).

When system information is transmitted on the PBCH, the one information bit which was originally designed to indicate the PHICH duration, (e.g., the number of OFDM symbols used for PHICH transmissions), together with the two bits assigned to indicate the number of PHICH groups configured in the cell, (e.g., the number of resources reserved in the control region for PHICH transmission as a fraction of the downlink bandwidth), may be used to explicitly signal the configuration parameters for E-PHICH transmission. In other words, the WTRU may receive partial information regarding the configuration parameters from physical channels (e.g., PBCH) and the rest of the parameters through higher layer signaling (e.g., MAC, RRC).

When the E-PHICH and the E-PDCCH are multiplexed and transmitted on the same control region consisting of multiple RBs, and the configuration information transmitted on the PBCH is not sufficient to extract the exact knowledge regarding the E-PHICH resources, the WTRU may blindly process the E-PDCCH under different E-PHICH configuration hypotheses. As the outcome of the blind processing, whenever one of the hypotheses holds true, the WTRU may be able to gain knowledge regarding the exact resources used for E-PHICH transmissions.

When the E-PHICH and the E-PDCCH are multiplexed and transmitted on the same control region consisting of multiple RBs, the WTRU may implicitly derive some of the configuration parameters for the E-PHICH from the E-PDCCH configuration. For example, when the WTRU has been assigned a specific DM-RS antenna port for E-PDCCH transmission, the WTRU may assume that the same DM-RS antenna port has been used for E-PHICH transmission. Similarly, whenever the WTRU has the knowledge regarding the aggregation level used for E-PDCCH transmission, the WTRU may assume that the repetition factor used for the E-PHICH transmission is the same as the aggregation level used for the E-PDCCH. This method may obviate the need for additional signaling to indicate some of the E-PHICH configuration parameters.

In one example of resource mapping for E-PHICH, each E-PHICH group may be mapped to multiple E-PHICH resource element groups (pREGs) within a resource block. The number of pREGs used for transmission of a single E-PHICH group may depend on the repetition coding used for range extension. Each pREG may include multiple REs (subcarriers) within the resource block allocated for E-PHICH transmission.

The pREG may be the same as the eREG defined for E-PDCCH distributed transmission. The pREG index may be mapped onto a WTRU-specific antenna port. The antenna port number may be one of antenna ports $p \in \{107, 108, 109, 110\}$. The mapping rule between the pREG index and a WTRU-specific antenna number may be predefined. The antenna port $p \in \{107, 108, 109, 110\}$ may have the same reference signal patterns and/or sequence as an antenna port $p \in \{7, 8, 9, 10\}$. The number of REs per pREG may be the same, irrespective of the number of available REs in a PRB-pair for E-PHICH and/or E-PDCCH transmission. For example, if multiple channel state information reference signals (CSI-RS) and zero-power CSI-RS are configured in a subframe, the number of available REs for E-PHICH and/or E-PDCCH transmission may be smaller than the subframe not containing any CSI-RS assuming that the RE occupied by CSI-RS, and zero-power CSI-RS may not be used for E-PHICH and/or E-PDCCH transmission. If PRBs are shared for E-PHICH and E-PDCCH transmission, the eREG for the E-PDCCH may be defined within the remaining REs after allocating REs for the pREG in a PRB-pair. For example, if 120 REs in a PRB-pair are available for E-PHICH and/or E-PDCCH transmission and 20 REs are required for the E-PHICH, assuming that 5 pREGs need to be defined and each pREGs contains 4 REs, 100 REs may remain for the E-PDCCH. In this case, 100 REs may be divided into N eREGs, where N may be one of $\{8, 12, 16, 24, \text{ or } 36\}$. For example, N may be a fixed number such as 16. The number of REs for a pREG may be fixed (e.g., 4 REs) while the number of REs for an eREG may vary according to the available number of REs for the E-PDCCH in a PRB-pair (e.g., 6 REs in subframe n, and 8 REs in subframe n+1).

The number of REs per pREG may vary according the number of available REs in a PRB-pair for E-PHICH and/or E-PDCCH transmission. In this case, the number of REs for a pREG may be the same as that for an eREG in a PRB-pair. If PRBs are shared for E-PHICH and E-PDCCH transmission, a subset of the eREGs may be used for pREGs definition. For example, if 120 REs in a PRB-pair are available for E-PHICH and/or E-PDCCH transmission and 5 pREGs need to be defined in the PRB-pair, the 120 REs may be divided into NREGs and 5 REGs may be used as pREGs, the rest may be used for eREGs, where N may be one of {8, 12, 16, 24, or 36}. The subset of REGs may be selected in a predefined manner.

To guarantee the performance of the E-PHICH, the REs located in OFDM symbols containing WTRU-specific REs may be used for pREGs and the rest of the REs may be used for E-PDCCH resources.

In another example, the WTRU may assume that a pREG is composed of four consecutively available REs in one OFDM symbol in a PRB-pair configured for potential E-PHICH transmission counted in ascending order of subcarriers. The WTRU may further assume that an RE is unavailable with respect to mapping the E-PHICH if the RE is used for the transmission of cell-specific reference signals. If the cell-specific reference signals are configured to be transmitted only on antenna port 0, the WTRU may assume that REs for transmission of cell-specific reference signals on antenna port 1 are unavailable for a pREG. If zero power or non-zero power channel state information reference symbols (CSI-RS) occur in any RE of an eight-port CSI-RS configuration, the WTRU may assume that all eight REs corresponding to the eight-port CSI-RS configuration are unavailable for a pREG.

If the RE is used for the transmission of WTRU-specific reference signals. The WTRU may assume that the REs (k,l) are used for transmission of WTRU-specific reference signals on any of the antenna ports in the set S, where S={7, 8, 11, 13} or S={9, 10, 12, 14}. The WTRU may assume that the REs (k,l) are used for transmission of WTRU-specific reference signals on any of the antenna ports in the set S, where S={7, 8, 9, 10, 11, 12, 13, 14}.

Figure 10:
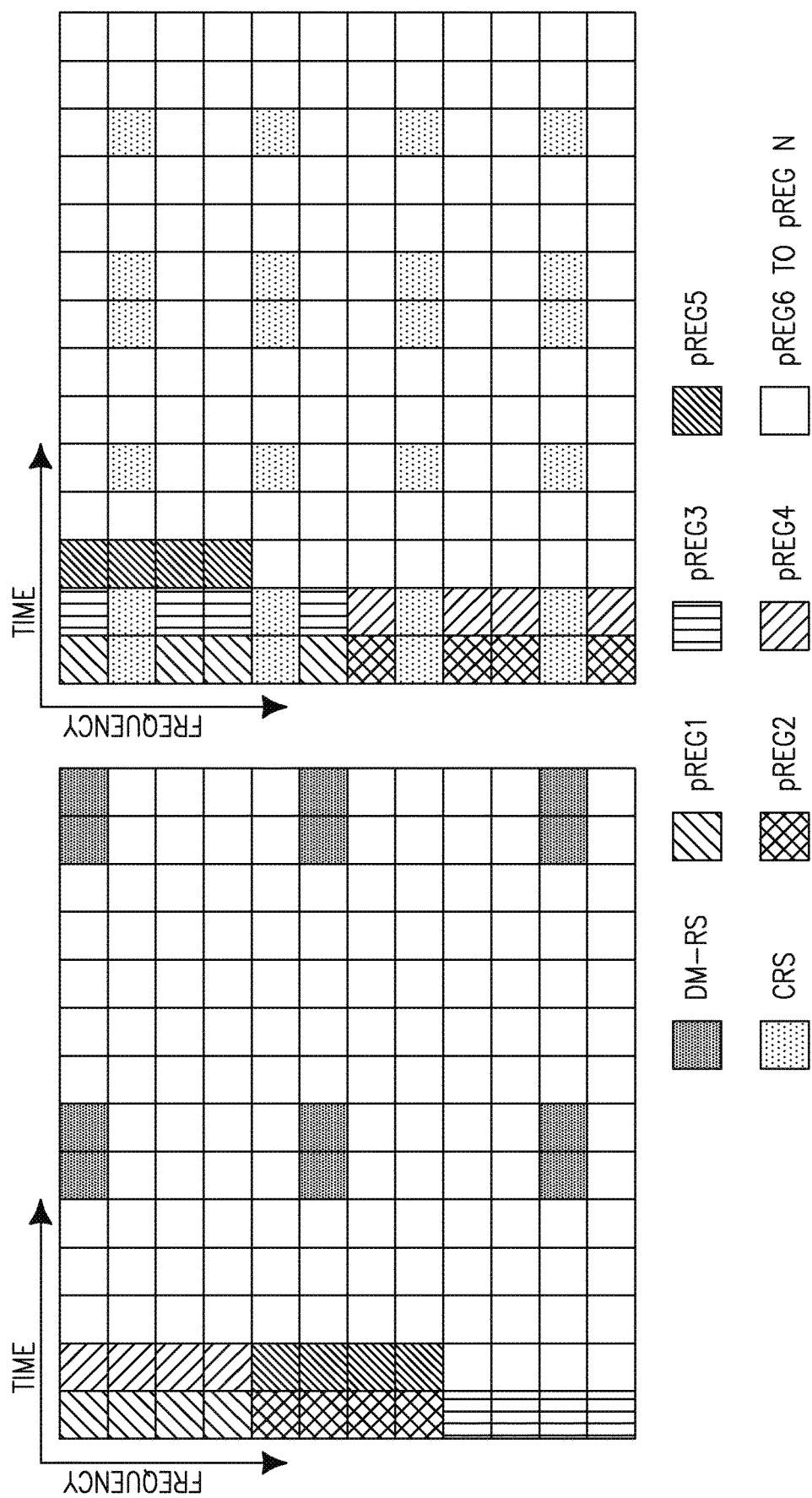
FIG. 10 shows E-PHICH resource mapping for two different reference symbol configurations.
Figures 11, 12:
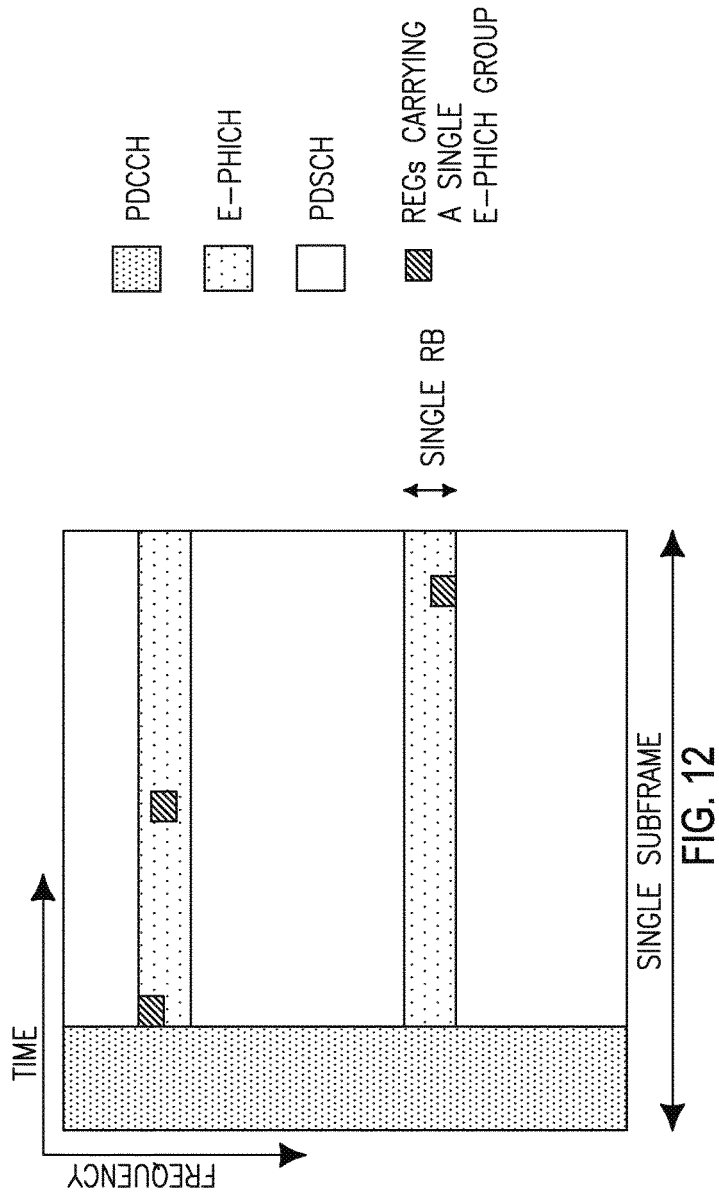
FIG. 11 shows available REGs for E-PHICH transmission within a single resource block (RB)
FIG. 12 shows an example of REG mapping with interleaving and cyclic shift.

Depending on the reference symbol pattern transmitted in a subframe and the size of the REG, the number of REGs available within a PRB-pair may vary. For example, in the case of an REG with a length of four, as shown in FIG. 10, when a PRB-pair is configured to carry the WTRU-specific reference symbols and the cell-specific reference symbols are turned off, the maximum number of available REGs within a subframe in the absence of CSI-RS is 38, as indicated in FIG. 11. Thus, for a given subframe, there may be three REGs per OFDM symbol for those OFDM symbols that do not carry the reference signals, while the number of REGs in those OFDM symbols that carry reference signals is limited to two. Alternatively, as shown in FIG. 10, when a RB is configured to carry the cell-specific reference symbols, the maximum number of available REGs within a subframe is slightly lower (36), due to the higher overhead of the reference symbols, as indicated in FIG. 11.

When there is a legacy PDCCH region in the subframe, the number of REGs within an RB available for E-PHICH transmission may vary according to the size of the PDCCH region. The number of REGs for an E-PHICH transmission within a PRB-p air in the presence of a legacy PDCCH region is shown in FIG. 11. The total number of available REGs within a subframe may also be a function of the number of RBs allocated to E-PHICH and/or E-PDCCH transmission. For the latter, the REGs can be shared for both E-PHICH and E-PDCCH transmission. For example, the WTRU may extract and decode the E-PHICH from a dedicated region for control transmission, and then may extract and decode the E-PDCCH while skipping REGs used for E-PHICH.

As for the mapping of the code multiplexed sequence to the REGs, the sequence may be interleaved to achieve diversity gain and/or cyclically shifted to randomize inter-cell interference. The pattern of cyclic shift of the REGs within a subframe may be a function of the cell ID, the subframe-number, and/or the RB index. FIG. 12 shows an example of REG mapping with interleaving and cyclic shift, whereby one E-PHICH group is mapped on three REGs. The REGs carrying a single E-PHICH group may be distributed across both the time and frequency domains to maximize both time and frequency diversity gains.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A wireless transmit/receive unit (WTRU) comprising:
   a transceiver; and
   a processor,
   wherein the transceiver and the processor are configured to receive a master information block (MIB) on a physical broadcast channel (PBCH), wherein the MIB includes a configuration for control channel element (CCE) resources,
   wherein the transceiver and the processor are further configured to transmit uplink data on a physical uplink shared channel (PUSCH),
   wherein the transceiver and the processor are further configured to receive at least one CCE in the configured CCE resources,
   wherein the at least one CCE includes a sequence of bits, each of the of the bits in the sequence indicating whether a respective block of the uplink data is required to be retransmitted, and
   wherein at least the bits in the sequence are channel coded and have a cyclic redundancy check (CRC) attached.

2. The WTRU of claim 1, wherein the transceiver and the processor are further configured to transmit the respective block of data on the PUSCH in response to the received at least one CCE.

3. The WTRU of claim 2, wherein the sequence of bits comprises more than two bits.

4. The WTRU of claim 1, wherein the at least one CCE is received with CCEs associated with physical downlink control channels (PDCCHs).

5. The WTRU of claim 1, wherein the bits in the sequence are rate matched after being channel coded.

6. The method of claim 1, further comprising transmitting the respective block of data on the PUSCH in response to the received at least one CCE.

7. The method of claim 6, wherein the sequence of bits comprises more than two bits.

8. A method, implemented in a wireless transmit/receive unit (WTRU), the method comprising:

receiving a master information block (MIB) on a physical broadcast channel (PBCH), the MIB including a configuration for control channel element (CCE) resources;

transmitting uplink data on a physical uplink shared channel (PUSCH); and receiving at least one CCE in the configured CCE resources, wherein the at least one CCE includes sequence of bits, each of the bits in the sequence indicating whether a respective block of the uplink data is required to be retransmitted, and wherein at least the bits in the sequence are channel coded and have a cyclic redundancy check (CRC) attached.

9. The method of claim 8, wherein the receiving the at least one CCE further comprises receiving the at least one CCE with CCEs associated with physical downlink control channels (PDCCHs).

10. The method of claim 8, wherein the bits in the sequence are rate matched after being channel coded.

11. A base station comprising:
a transceiver; and
a processor,
wherein the transceiver and the processor are configured to transmit a master information block (MIB) on a physical broadcast channel (PBCH), wherein the MIB includes a configuration for control channel element (CCE) resources, wherein the transceiver and the processor are further configured to receive uplink data on a physical uplink shared channel (PUSCH), wherein the transceiver and the processor are further configured to transmit at least one CCE in the configured CCE resources, wherein the at least one CCE includes a sequence of bits, each of the bits in the sequence indicating whether a respective block of the uplink data is required to be retransmitted, and wherein at least the bits in the sequence are channel coded and have a cyclic redundancy check (CRC) attached.

12. The base station of claim 11, wherein the transceiver and the processor are further configured to receive the respective block of data on the PUSCH in response to the received at least one CCE.

13. The base station of claim 12, wherein the sequence of bits comprises more than two bits.

14. The base station of claim 11, wherein the at least one CCE is transmitted with CCEs associated with physical downlink control channels (PDCCHs).

15. The base station of claim 11, wherein the plurality bits in the sequence are rate matched after being channel coded.

* * * * *